Figure 1:
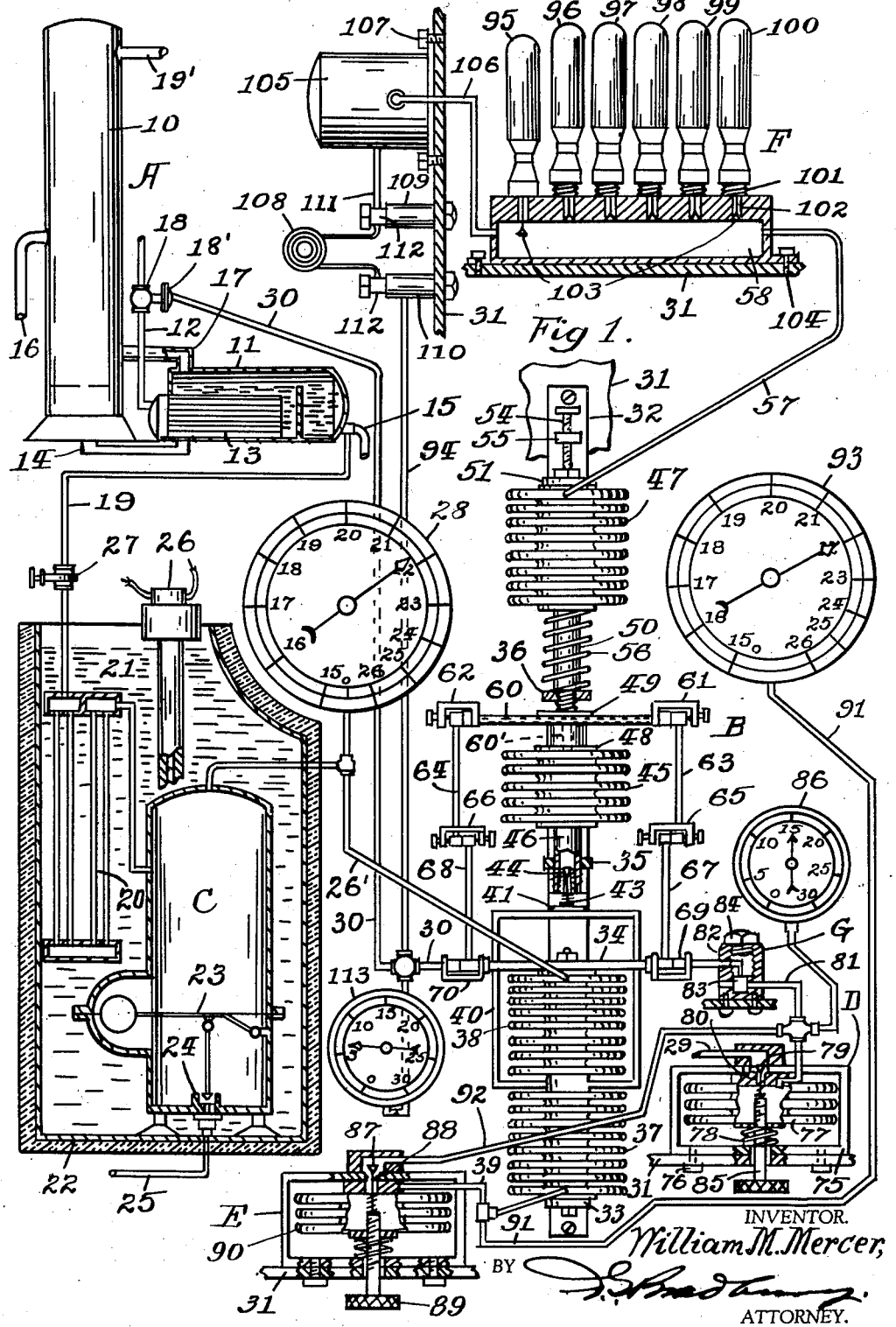

Feb. 16, 1943.   W. M. MERCER   2,310,979
GASOLINE AND OIL VAPOR PRESSURE CONTROLLER
Filed Aug. 23, 1939   2 Sheets-Sheet 1

INVENTOR.
William M. Mercer,
BY
ATTORNEY.

Feb. 16, 1943.  W. M. MERCER  2,310,979
GASOLINE AND OIL VAPOR PRESSURE CONTROLLER
Filed Aug. 23, 1939  2 Sheets-Sheet 2
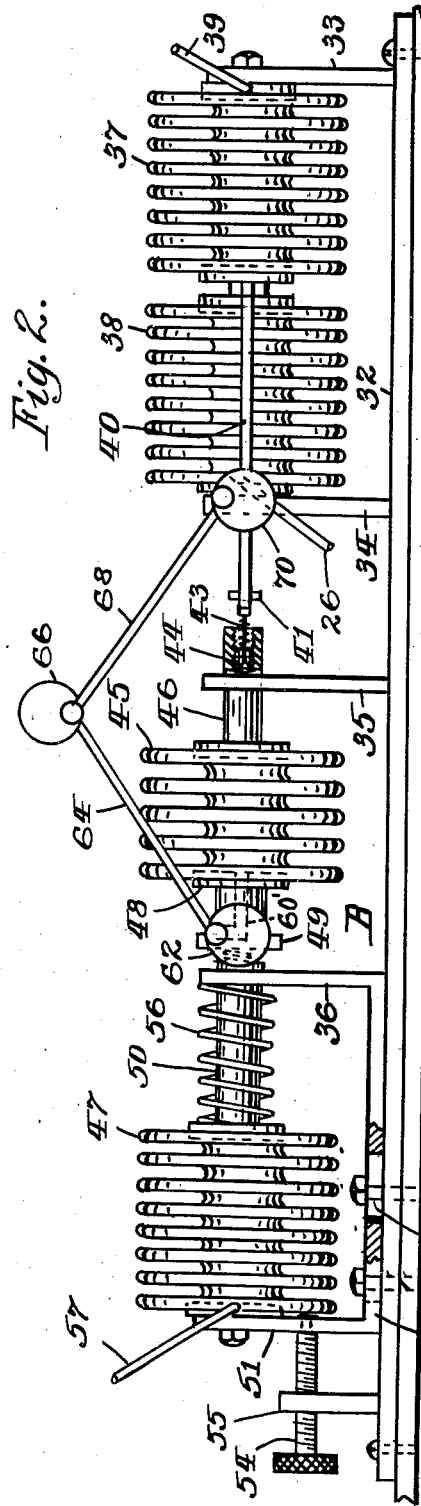
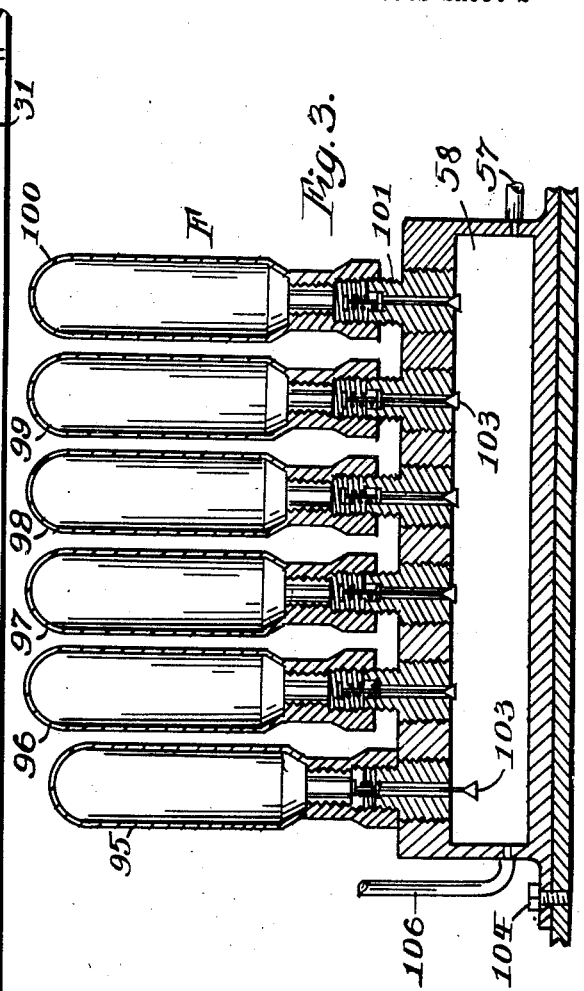
INVENTOR.
William M. Mercer,
BY
ATTORNEY Patented Feb. 16, 1943

2,310,979

UNITED STATES PATENT OFFICE 2,310,979

GASOLINE AND OIL VAPOR PRESSURE CONTROLLER

William M. Mercer, Avenal, Calif.

Application August 23, 1939, Serial No. 291,594

4 Claims. (Cl. 137—153)

My invention relates to an improved vapor pressure controller for automatically controlling the operation of gasoline stabilizer units, various types of fractionating and other vapor producing apparatus, by changes in pressure of vapor produced from gasoline, oil and other volatile substances.

One of the objects of this invention is to provide means whereby a rectifier system may be automatically controlled to deliver the final end liquid product of substantially constant vapor pressure. Therefore one of the uses of this invention is in the rectification of gasoline and oil. Another object is the production of a highly efficient responsive means for controlling the operation of any type of apparatus by slight variations in pressure of vapor produced by volatilizing a volatile substance, thus rendering the invention particularly applicable for use with a fractionating apparatus so as to control and produce a refined liquid product of a fixed and unvarying volatility or vapor pressure. Another object is to directly and automatically indicate and/or permit recording of the volatility of a liquid in the apparatus for use in effecting control of the apparatus for a specific purpose. Another object is the production of means by which the vapor pressure controller is variable, that is it can be adjusted and set to regulate the flow of liquid from the stabilizer of any desired uniform quality and according to slight variations in vapor pressure produced thereby. For instance my invention will regulate the octane number of gasoline produced by a gasoline stabilizer or fractionator by a variation of less than one tenth of a pound in vapor pressure. A still further object is to eliminate pressure lag on the steam throttle valve of a stabilizer during the operation of the apparatus and to eliminate the time lag from the time the stabilizer temperature changes until the vapor pressure reacts upon the controlling apparatus.

The invention possesses other objects and features of advantage, some of which, with the foregoing, will be set forth or be apparent in the following description, of which the accompanying drawings form a part.

Figure 1 of the drawings is a schematic plan of my invention, part of the apparatus being shown in plan, part in side elevation and part in section, for the purpose of more fully illustrating the complete invention in a single view; Fig. 2 is a side elevation of my improved vapor pressure controller, partly in central vertical section, and Fig. 3 is a central longitudinal central section and partly in side elevation and vertical section.

My invention is shown in the drawings applied to a gasoline stabilizer unit A for controlling the quality of the gasoline product produced thereby but it will be understood that the invention is equally applicable to oil, alcohol and other hydrocarbon and liquid fractionating and refining apparatus. The stabilizer as shown has the usual stabilizer column 10, stabilizer kettle 11 and steam heating supply duct 12 for the heating tubes 13 in the kettle, gasoline supply duct 14 into the kettle from the column 10, outlet duct 15 for the finished gasoline product, raw gasoline supply duct 16 entering the column, and spent gas and vapor ducts 17 and 19' from the kettle entering the median portion of the column and egressing from the upper end of the column. For regulating the supply of steam admitted to the heating coil in the kettle an air operated power controlled throttle valve 18 is provided in the supply duct 12, which is regulated by an actuating element 18', such as a diaphragm through variations of air pressure from a suitable source of supply and controlled by variations in gasoline vapor pressure emanating from the stabilizer and controlled by my improved vapor pressure responsive unit B.

Initially the operation of the heating coil 13 is controlled automatically by using a small stream of the continuous supply of gasoline product, which stream is conducted through a small branch 19 into a tubular heater 20. This heater is emersed in a bath of liquid 21, such as oil, in the heat insulating jacketed container 22. Also emersed in said bath is a vapor pressure pilot bomb or flask C, which receives the stream of hydrocarbon products from said heater. An even quantity of hydrocarbon product is maintained in bomb C, by a float control 23 which operates a controlling valve 24 and allows any excess of said product to flow into a vacuum line 25 or other suitable outlet. The oil bath is heated and automatically maintained at an even temperature by the thermostatically controlled electric heating unit 26. I have found a satisfactory temperature of the bath for treating gasoline in the bomb to be about 100 degrees F. This temperature serves to vaporize the stream of gasoline which is continuously supplied to the bomb and the vapor thus produced is transmitted by the duct 26' from the upper portion of the bomb to my improved vapor pressure responsive unit B as will be hereinafter described. A controlling orifice element 27 in duct 19, which in practice is about .0020" in diameter, reduces the supply of gasoline transmitted to the bomb to a steady flow sufficient for use in the successful operation of my improved vapor pressure controller. Also a vapor pressure indicator 28 showing absolute vapor pressure readings, connected with vapor duct 26' guides the operator in determining the vapor pressure at which the apparatus operates and the resulting product produced by the stabilizer.

Initial air supply originates from any suitable source for operating the power controlled steam valve 18, such source being usually available in a gasoline plant through the air supply duct 29 which reduces it to substantially 15 pounds pressure, by which it is conducted to my improved vapor pressure responsive unit. This air supply is conducted from said unit by the controlling duct 30 to the valve actuator 18'. As shown the actuator for valve 18 is of diaphragm type although a piston or other suitable type of actuator may be used.

Fig. 1 of the drawings is a schematic view in which a plan of my improved vapor pressure responsive unit is shown, parts thereof being broken away and in section. In this view the stabilizer and kettle are shown partly in side elevation and section, the pilot vapor generator and its bomb C for operating the responsive unit B is shown partly in central vertical section, the air supply regulators D and E are shown in elevation and partly in section, the air volume control is shown partly in vertical longitudinal central section and the volume control tank 105 is shown in side elevation and partly in vertical section, for more clearly illustrating the operation of the invention. In use the vapor generator, vapor pressure responsive unit, air regulators and volume control with its tank may be assembled as a single unit, the casing of the heater acting as a support for the remaining parts. Therefore the support marked 31 in the several parts may be considered as an integral part of the receptacle 22 if desired or any other suitable support.

*Vapor pressure responsive unit*

31 represents a suitable base upon which is mounted a supporting frame 32 having a longitudinal series of vertical posts 33, 34, 35 and 36 (see Fig. 2). Between the pair of posts 33 and 34 two coaxially opposed resilient bellows 37 and 38 are mounted, each bellows being sealed and readily expansible against inherent spring tension by inflation. The bellows 38 is connected with duct 26' and is adapted to be inflated by and respond to the pressure of the vapor received from the vapor pressure bomb C. Bellows 37 is connected by duct 39 with the air regulator E and responds to the pressure of air received therefrom to oppose the pressure of vapor in bellows 38. The adjacent ends of the bellows are rigidly attached and a yoke frame 40 is secured at one end by said attachment so as to be reciprocated by the action of the two bellows. The chambers within the two bellows are unconnected. This yoke spans the bellows 38 and its sides slide freely in post 34. The free end of the yoke carries an abutment 41 which is adapted to depress the stem of an automatic relief valve 44 as will be hereinafter described. Normally the air and vapor bellows 37 and 38 are counter-poised, the pressure of air and vapor therein being equal.

Coaxial with the air and vapor bellows 37 and 38 is an interchangable counter acting bellows 45 which is supported by the posts 35 and 36. A tubular shaft 46 on the axis of bellows 45 slides freely in the support 35 and contains the valve 44 by which its passage is closed or opened automatically through the action of the valve stem 43 as pressure is increased or decreased in either bellows 45 or reacting bellows 47 to be hereinafter described. The end of the bellows 45 opposite valve 44 is connected on its axis by the union 48 with a coupling 49 which in turn is attached by threading to the end of thrust shaft 50 of bellows 47, said shaft being solid and slidable through support 36. The coupling 49 provides a passage 60' between the transverse tube 60 and the chamber of bellows 45.

The reacting bellows 47 is arranged coaxial with the bellows 45, 38, and 37 and is supported at its end opposite shaft 50 on bracket 51, said bracket having its base 52 (see Fig. 2) slidably secured to be adjusted longitudinally on the support 32 by the bolt and slot connections 53. A thumb screw 54 threaded in an arm 55 of support 32 and swiveled to the bracket 51, provides an adjustable connection by which the bellows 47 can be varied to change the tension under which it functions. An expansion spring 56 threaded over the shaft 50 and shouldered against the post 36 and the projecting end of the reaction bellows 47 provides auxiliary compression against the expanding bellows 47 and causes a smooth even action of the swivel couplings to be hereinafter described.

The fixed end of the reacting air bellows 47 is connected by tubing 57 with the manifold 58 of an air volume control F, and the coupling 49 entering the movable end of the counter acting air bellows 45 is provided with a horizontal transverse tube 60, the outer ends of which terminate equally on either side of the axis of the vapor responsive unit. The ends of this tube are connected by antifriction swivel couplings 61 and 62 with the lower end of a pair of upwardly slanting longitudinal tubes 63 and 64. The upper ends of these tubes are hinged by a pair of antifriction couplings 65 and 66 to the upper ends of a corresponding pair of downwardly slanting longitudinal tubes 67 and 68. The lower ends of these tubes 67 and 68 are connected with a pair of swivel couplings 69 and 70 which are mounted on the opposite transverse ends of the fixed post 34. The coupling 69 is connected with the air supply regulator D to be hereinafter described and the coupling 70 is connected with the air pressure supply duct 30 which actuates the steam controlling valve 18 on the stabilizer kettle. The couplings and tubes described provide a flexible connection which permits the free reciprocation of the reacting and counteracting bellows of the vapor pressure responsive unit. Any slight longitudinal movement of the coupling caused by the expansion or contraction or adjustment of the reacting bellows 47 is delicately compensated by the antifriction swivel couplings without interrupting or impairing the transmission of air pressure from the regulator D to the steam valve control of the stabilizer. Other flexible means may be used for permitting the free and efficient functioning of the bellows within the spirit of the invention. The air bellows 37, vapor pressure bellows 38 and reacting bellows 47, as shown are substantially of corresponding volume while the counteracting air bellows 45 is of less volume. The bellows 45 and 47 are interchangeable to different volumes as will be hereinafter described. These bellows as well as the bellows employed in the air supply regulators D and E to be hereinafter described are of thin metal resilient type which readily expand under spring tension and when expanded tend to return to normal unexpanded condition.

*Air supply regulator D*

The air supply regulator D consists of a supporting frame 75 secured on the support 31 by bolts 76 and containing vertically expansive air bellows 77, the upper end of which is rigidly secured to the frame and the lower end pressing against an expansion spring 78 which rests upon said frame. The upper end of the bellows has an air admission check valve 79 the opening of which is controlled by the thumb screw 85 which is threaded through the lower end of the bellows. The inner end of this screw is positioned below the stem of the valve 79 so as to open the valve when screwed in or release the valve into closed condition when screwed out. The valve 79 controls the port 80 which is connected with the air supply duct 29. The bellows 77 is connected with the swivel coupling 69 by the air duct 81. An orifice fitting G is interposed in the duct 81 to govern the air supply to the counteracting bellows valve 44. This fitting consists of a casing 82 containing a duct 83 which is connected at its opposite ends with opposite portions of the air duct. The casing is shown mounted upon the support 31 and its threaded opening contains an interchangeable screw 84 which has an orifice of selected size to govern the flow of air through duct 81. The regulator D furnishes air to the responsive unit B and vapor pressure set regulator E and is set by the screw 85 so as to hold 15 pounds gauge pressure on the air conducting line 81 leading to the orifice fitting and air supply regulator E. A suitable air gauge 86 indicating pounds per square inch is connected into the air line 81.

*Air supply regulator E*

The air supply regulator E is substantially similar in construction to regulator D, the check valve 87 which closes the port 88 being automatically opened by the screw 89. This screw is hand adjusted by turning in the free end of the bellows 90. The port receives air under pressure from the controlling duct 81 by the branch duct 92 and the bellows 90 which is inflated by the admission of air is connected by duct 39 with the air bellows 37 of the vapor pressure responsive unit. A branch 91 from duct 39 is connected with an air gauge 93 which is similar to gauge 28 and is adapted to indicate absolute air pressure.

*Volume control F*

To compensate the time lag caused by orifice 27, in the gasoline feed line from the kettle to the tubular heater 20 in the heating bath 21, the reacting bellows 47 is connected with a volume control. This volume control eliminates time lag and consists of an air volume control manifold 98 which has a series of timing volume control bulbs 95 to 100 inclusive, which are attached by threaded socket connections 101 and provided with valved ducts 102 entering the manifold. A spring pressed relief valve 103 normally closes each of said ducts when any one of the tubes is partly unscrewed or removed, thus cutting out part of the volume of air in connection with the manifold. When a tube is screwed into its socket it depresses the corresponding valve to form an open connection with the manifold and increase the volume of air. As shown tube 95 is screwed into its socket and is connected to increase the volume while the remaining tubes are partly unscrewed and their respective parts closed thus eliminating part of the volume. The manifold is shown secured upon the support 31 by bolts 104. The opposite end of the manifold is connected with the air volume tank 105 by tubing 106, said tank being mounted by any suitable means such as bolts 107 on a portion of the support 31. This tank establishes a fixed volume of air and is connected in series with replaceable coils of resistant tubing such as 108. The ends of this coil are detachably connected respectively with couplings 109 and 110 to establish connection at one end by duct 111, with the air volume control tank 105 and by its other end through duct 94 with duct 30 which is connected with the actuator 18' of the steam valve. When desired the ends of the resistant tubing can be uncoupled by unscrewing the threaded binding posts 112 and a resistant tubing of different length and resistance inserted to vary the time lag caused by orifice 27 and flow of gasoline from the stabilizer.

At the junction of the air line 94 leading from the resistant element 108 and the air controlling line 30 leading from coupling 70 is the air gauge 113 which like the gauge 86 indicates pounds to the square inch.

*Operation*

The regulator D acts as an air pressure reducer furnishing air under pressure to the responsive unit B and vapor pressure set regulator E. The regulator D receives air by duct 29 from any suitable source of supply which is usually available in a gasoline plant or refinery, the pressure for illustration being 15 pounds to the square inch. To adjust this regulator the thumb 85 is turned until the indicator 86 shows the required pressure. Air thus admitted passes into the bellows 77. When pressure starts building up, bellows 77 starts expanding thus allowing valve 79 to close and hold 15 pounds air pressure in duct 81 leading to the orifice fixture 82 and in duct 92 leading to the vapor pressure set regulator E. It will be noted that gauges 86 and 113, register pounds per square inch and that gauges 28 and 93 register absolute pressures. Now that the pilot air supply regulator has been set at 15 pounds pressure and assuming that the raw gasoline which is admitted into the stabilizer unit through line 16 has an absolute vapor pressure of 30 pounds and it is desired to boil it down to 21.8 pounds vapor pressure, the regulator E is adjusted to 21.8 pounds as shown by indicator 93, thus building up vapor presure in the bellows 37 as indicated by said absolute air pressure indicator 93. A small continuous pilot stream of gasoline flowing from the finished gasoline line 15 through pilot duct 19 into the heater 20. The latter has sufficient capacity to allow the temperature of this small stream to become equalized with the temperature of the heating bath 21 which is maintained at 100 degrees F. automatically by the thermostatically controlled electric heating unit 26. This pilot stream of gasoline at said temperature enters the bomb C and is maintained at a regulated level in the lower portion of the bomb by means of the valve 24 in the vacuum line 25 which is automatically controlled by the liquid level controlling float 23. Gasoline vapor collects in the bomb from the pilot stream of gasoline, the pressure thereof being registered on the vapor indicator 28. This gasoline vapor under the pressure thus indicated enters the vapor pressure bellows 38. As the pressure increases in the vapor pressure bellows 38 according to the indicator 28, the bellows expands and overpowers the expansive effort of the air bellows 37 and moves the yoke 40 away from the needle valve stem 43, thus releasing valve 44 into closed position and causing increased air pressure to enter the operating unit 18' and increase the opening of the throttle valve of the steam heating supply duct 12 for the heating tubes in the kettle 11. Opening of the steam throttle valve 18 admits more steam into the stabilizer kettle thus boiling more light vapors out of the finished gasoline which lowers the gasoline vapor pressure. As the gasoline vapor pressure starts lowering in the vapor pressure bellows 38, the air pressure set bellows 37 starts expanding overpowering and compressing vapor pressure bellows 38 moving yoke 40 forward against the valve stem 43 thus opening valve 44 and lowering the pressure in duct 30 and regulating unit 18', and closing valve 18. This action causes less gasoline to be boiled in the stabilizer kettle and consequent less production of gasoline vapor off of the finished gasoline thus raising the gasoline vapor pressure.

In practice I have found that the gasoline flow from the gasoline stabilizer unit through the pilot tubing 19 and orifice unit 27 has been approximately nine gallons per hour and that it requires with this flow approximately two and one-half minutes from the time the stabilizer kettle temperature changes until the vapor pressure bomb registers on the vapor pressure bellows 38. This lag is eliminated by the reacting bellows 47 and timed by the volume control bulbs 95 to 100 inclusive and resistant tubing 108. For illustration when the vapor pressure bellows 38 expands overpowering and compressing regulating bellows 37 sliding yoke 40 away from and releasing needle valve stem 43 into valve closing position, air pressure on the valve actuating unit 18' and in duct 30 increases. This increased air pressure is transmitted by duct 94 to the resistant element 108, air volume chamber 105, volume control manifold 58 and reacting bellows 47, thus causing the reacting bellows 47 to expand. The expansive movement of the reacting bellows 47 against the effort of the compression spring 56 is conveyed by the plunger 50 and coupling to the counteracting bellows 45 which slides the sleeve 46 with its valve stem 43 forward through supports 35 and 36 (the latter being integral with the bracket 52), thus pressing the valve stem 43 against the end of the yoke 40 and releasing valve 44 into open position. The opening of valve 44 releases pressure from duct 30 and the valve actuating element 18' and causes the supply of steam to the stabilizer kettle to be reduced thus increasing the vapor pressure of the finished product. This timing can be changed on the reacting bellows 47 to open or close the steam controlling valve 18 back to the original setting after it has been opened or closed for substantially 10 seconds or it can leave the steam valve 18 open or closed any length of time from substantially 10 seconds to two minutes depending upon the amount of time needed to obtain the correct controlling. This timing is maintained by increasing or decreasing the amount of air volume supply that flows back and forth through the resistant tubing 108 as the pressure is increased or decreased in the valve actuating air duct 30. If the action requires slowing down an additional air volume bulb (95 to 100) is screwed down thus opening its valve and connecting its chamber with the manifold and increasing the total air value which is connected into the air volume controlling line and causing a slower action on the reacting bellows 47. If a quicker action is needed on the reacting bellows 47, an air volume bulb is screwed up thus closing its valve and cutting its chamber out of service. As many of these bulbs may be connected as required. Resistant elements 108, of different tubular diameter and length and consequent variation in resistance, may be readily connected into and out of service in the volume control line by the binding screws 112 on the coupling posts 109. In practice I have used a resistant tubing having a duct .001" in diameter and of a carefully calculated length. The tank 105 constitutes a roughly fixed volume and the resistant element constitutes an impedance element which regulates to a certain degree the timing of the flow. The volume bulbs 95 to 100 inclusive, cooperating with the resistant tubing produces a minutely calculated regulating resistance to the flow of pilot air to the valve to obtain the desired timing and eliminate pressure lag on the gas or oils being treated.

The counteracting bellows valve 44 operates as a regulator and the setting is changed by the vapor pressure bellows 38 or the reacting bellows 47. What ever the setting is changed to the counter acting bellows 44 maintains that pressure on the duct 30 and valve actuating unit 18' of the steam regulating valve 18 until either vapor pressure bellows 38 or reacting bellows 47 has changed the setting. The amount of action of the steam regulator 18 may be adjusted to one tenth of a pound vapor pressure change on the finished gasoline, which variation is determined by the counteracting bellows valve 44. If steam regulator 18 requires a wider opening and closing action, per one tenth of a pound of the vapor pressure change on the finished gasoline, the counteracting bellows 45 of five flanges as shown with its check valve can be removed and a counteracting bellows of a different number of flanges and consequent volume can be installed to obtain the desired controlling action.

I desire to have it understood that the construction shown is only illustrative and that the invention can be carried out by other means and applied to uses other than those above set forth within the scope of the following claims.

I claim:

1. A pressure regulator, comprising, a line for supplying operating fluid under pressure to a valve controlling element, a pilot valve for releasing operating fluid from said line to influence the operation of said controlling element, a pair of opposed bellows connected to said pilot valve and normally balanced to maintain the pilot valve in normal operative position, each of the members of said opposed bellows being exposed to an independently controlled pressure fluid supply, and auxiliary fluid volume controlled means comprising a series of volume chambers independently connected with said pilot valve for selectively varying delayed action thereof.

2. A pressure regulator, comprising, a line for supplying operating fluid under pressure to a valve controlling element, a pilot valve for releasing operating fluid from said line to influence the operation of said controlling element, a pair of opposed bellows mechanically connected to said pilot valve and normally balanced to maintain the pilot valve in normal operative position, each of the members of said opposed bellows being exposed to an independently controlled pressure fluid supply, and auxiliary fluid volume controlled means connected with said pilot valve for increasing volume in said line and delaying action, said auxiliary fluid volume controlled means being actuated by fluid received from said line and containing a series of independently removable fluid receiving chambers permitting of adjustment to increase or decrease the fluid volume and assist in regulating the period of delayed action of the pilot valve.

3. A pressure regulator, comprising, a line for supplying operating fluid under pressure to a valve controlling element, a pilot valve for releasing operating fluid from said line to influence the operation of said controlling element, a pair of opposed bellows mechanically connected to said pilot valve and normally balanced to maintain the pilot valve in normal operative position, each of the members of said opposed bellows being exposed to an independently controlled pressure fluid supply, auxiliary fluid volume controlled means connected with said pilot valve for increasing volume in said line and delaying action, said auxiliary fluid volume controlled means being actuated by fluid received from said line and containing a series of independently removable fluid receiving chambers permitting of adjustment to vary the fluid volume and assist in regulating the period of delayed action of the pilot valve, and a spring poised mechanical adjustment for regulating the sensitiveness of regulation afforded by the fluid volume.

4. A pressure regulator, comprising, a line for supplying operating fluid under pressure to a valve controlling element, a pilot valve for releasing operating fluid from said line to influence the operation of said controlling element, a pair of opposed bellows mechanically connected to said pilot valve and normally balanced to maintain the pilot valve in normal operative position, each of the members of said opposed bellows being exposed to an independently controlled pressure fluid supply, auxiliary fluid volume controlled means connected with said pilot valve for increasing volume in said line and delaying action, said auxiliary fluid volume controlled means being actuated by fluid received from said line and including expansible bellows connected with said valve to influence its operation, and a delay acting volume chamber in series with said expansible bellows and connected with the fluid operating supply line.

WILLIAM M. MERCER.